(12) United States Patent
Kodama

(10) Patent No.: US 7,970,220 B2
(45) Date of Patent: Jun. 28, 2011

(54) IMAGE PROCESSING APPARATUS AND METHOD FOR PERFORMING DECODING PROCESS ON CODED DATA OF MOTION PICTURE BASED ON A PLURALITY OF ATTRIBUTES THEREOF

(75) Inventor: Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 11/601,477

(22) Filed: Nov. 16, 2006

(65) Prior Publication Data

US 2007/0110163 A1    May 17, 2007

(30) Foreign Application Priority Data

Nov. 16, 2005  (JP) .................................. 2005-330990

(51) Int. Cl.
G06K 9/46       (2006.01)
H04N 7/12       (2006.01)
(52) U.S. Cl. .................................... 382/233; 375/240.21
(58) Field of Classification Search .................... 382/233
See application file for complete search history.

(56) References Cited

U.S. PATENT DOCUMENTS

| | | | | |
|---|---|---|---|---|
| 5,623,424 A * | 4/1997 | Azadegan et al. | ............ | 708/203 |
| 6,650,787 B1 * | 11/2003 | Takahashi et al. | ............ | 382/251 |
| 6,937,770 B1 * | 8/2005 | Oguz et al. | .................... | 382/235 |
| 2002/0154823 A1 * | 10/2002 | Okada | ............................ | 382/233 |
| 2004/0022521 A1 * | 2/2004 | Kishi et al. | ...................... | 386/69 |
| 2005/0069039 A1 * | 3/2005 | Crinon | ...................... | 375/240.26 |
| 2005/0244068 A1 * | 11/2005 | Nakachi et al. | ............... | 382/240 |

FOREIGN PATENT DOCUMENTS

| | | |
|---|---|---|
| JP | 2002325257 | 11/2002 |
| JP | 2003-338995 | 11/2003 |
| JP | 2004-129217 | 4/2004 |

OTHER PUBLICATIONS

Japanese Office Action for corresponding Japanese Patent Application No. 2005-330990, Jul. 14, 2010, 2 pgs.

* cited by examiner

*Primary Examiner* — David P Rashid
(74) *Attorney, Agent, or Firm* — Blakely, Sokoloff, Taylor & Zafman LLP

(57) ABSTRACT

An image processing apparatus includes a decoding unit for performing a decoding process on coded data of a moving picture on a frame-by-frame basis, and a controller for controlling the decoding unit. The controller designates a first decoding condition using multiple attributes, such as resolution level, precinct, component, or layer, for each frame, and causes the decoding unit to perform the decoding process on those code streams that satisfy the first decoding condition among the coded data. If a decoding time required to perform the decoding process under the first condition is equal to or longer than a prescribed time period, the controller allows the decoding unit to finish the decoding process for a current frame. If the coding time is shorter than the prescribed time period, the controller designates a second condition as to the attributes for the current frame to cause the decoding unit to perform the decoding process on those codes streams that satisfy the second condition.

10 Claims, 10 Drawing Sheets

FIG.1
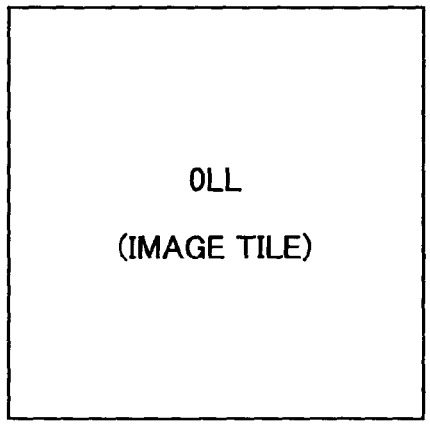
DECOMPOSITION_LEVEL_0
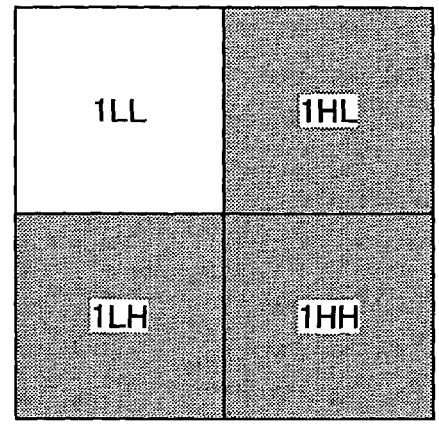
DECOMPOSITION_LEVEL_1
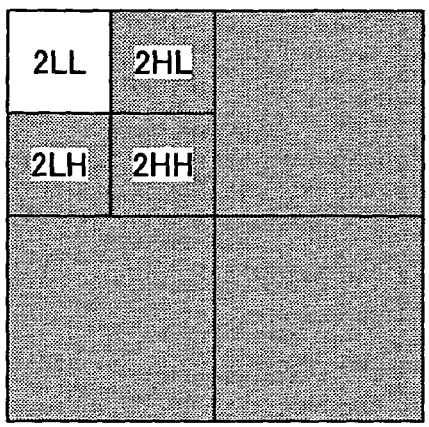
DECOMPOSITION_LEVEL_2
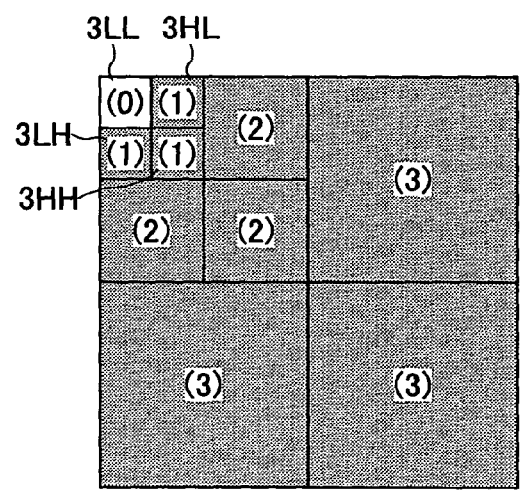
DECOMPOSITION_LEVEL_3

IMAGE PROCESSING APPARATUS AND METHOD FOR PERFORMING DECODING PROCESS ON CODED DATA OF MOTION PICTURE BASED ON A PLURALITY OF ATTRIBUTES THEREOF

PRIORITY

The present application is based on Japanese priority applications No. 2005-330990, filed Nov. 16, 2006, the entire contents of which are hereby incorporated herein by reference.

BACKGROUND OF THE INVENTION

1. Field of the Invention

The present invention relates to an apparatus and a method for coding and/or decoding image data of moving pictures.

2. Description of Related Art

Various techniques for reproducing JPEG 2000 images are proposed. JP 2004-129217A discloses a technique of variable speed playback of JPEG 2000 images capable of performing normal speed playback or slow speed playback for each frame. In this publication, when three-level subband decomposition is performed, for example, image codes of only the decomposition levels 2 and 3 are decoded during the slow playback, while image codes of all the decomposition levels are decoded in order to include higher frequency components (higher resolution components) during the normal speed playback.

Another publication, JP 2003-338995A, discloses a technique of high-speed playback of JPEG 2000 images coded on a frame basis. In this publication, code streams are decoded across the frequency components (from the lower frequency components to higher frequency components) in certain frames at prescribed frame intervals, while code streams of only lower frequency components are decoded in the rest of the frames. As the playback speed increases, the frame interval of the certain frames is increased.

Currently, Motion-JPEG 2000 performing frame-by-frame hierarchical coding is spreading. It is pointed out, however, that a problem arises with this moving picture coding scheme in conjunction with real-time decoding due to the JPEG 2000 algorithm being complicated. To overcome this problem, code streams of only the lower-frequency (lower-resolution) components are decoded in order to compensate for insufficient processing capability. The proposals of the above-described two publications are also made from the same viewpoint.

However, these conventional techniques do not make full use of the characteristics and features of the JPEG 2000 coding scheme. In spite of the fact that JPEG 2000 images consist of a set of codes having various attributes, including resolution levels, positions, color components and image qualities, the conventional techniques focus attention only on the resolution level.

SUMMARY OF THE INVENTION

An image processing apparatus and image process method are described. In one embodiment, an image processing apparatus comprises a decoding unit to perform a decoding process on coded data of a moving picture on a frame-by-frame basis, the coded data consisting of code streams having a plurality of attributes, including at least one of a resolution level, a location, a component, and an image quality; and a controller to designate a first condition as to the plural attributes for each frame and cause the decoding unit to perform the decoding process on those code streams that satisfy the first condition among the coded data. In this embodiment, the controller allows the decoding unit to finish the decoding process for a current frame if there is no pause request or low-frame-rate playback request received, while the controller designates a second condition different from the first condition as to the attributes for the current frame to cause the decoding unit to perform the decoding process on those codes streams that satisfy the second condition if the pause request or the low-frame-rate playback request has been received.

DESCRIPTION OF THE DRAWINGS

Other embodiments, features, and advantages of the invention will become more apparent from the following detailed description when read in conjunction with the accompanying drawings, in which:

FIG. 1 is a schematic diagram illustrating subband decomposition using two-dimensional wavelet transform;

DETAILED DESCRIPTION OF THE PREFERRED EMBODIMENTS

Figure 2:
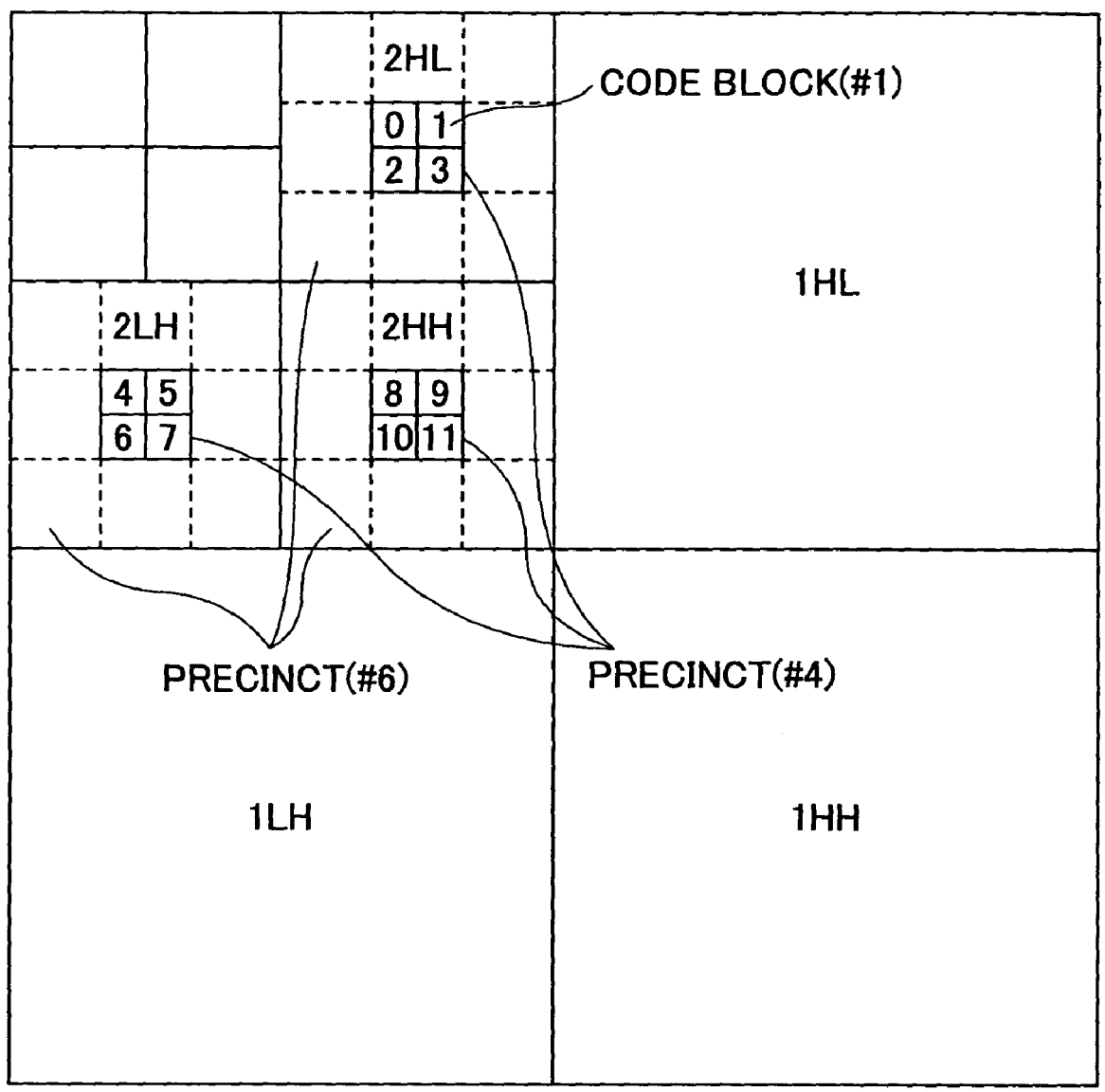
FIG. 2 is a schematic diagram illustrating code blocks and precincts.

One embodiment of the invention provides a more accurate and broader range of control of the decoding process of frame-based code streams of JPEG 2000 or other coding schemes of a moving picture to be decoded, making use of multiple attributes of the code streams of each frame.

Another embodiment of the invention provides a more accurate and broader range of control of the coding process for producing frame-based code streams of a moving picture using JPEG 2000 or other coding schemes.

In a first embodiment, an image processing apparatus includes a decoding unit to perform a decoding process on coded data of a moving picture on a frame-by-frame basis, and a controller for controlling the decoding unit. The coded data consist of code streams having a plurality of attributes, including at least one of a resolution level, a location, a component, and image quality. In one embodiment, the controller is operable to: (a) designate a first condition as to the plural attributes for each frame and cause the decoding unit to perform the decoding process on those code streams that satisfy the first condition among the coded data; (b) allow the decoding unit to finish the decoding process for a current frame if there is no pause request or low-frame-rate playback request received; and (c) designate a second condition different from the first condition as to the attributes for the current frame to cause the decoding unit to perform the decoding process on those codes streams that satisfy the second condition if the pause request or the low-frame-rate playback request has been received.

In an alternative, the controller is operable to (b) allow the decoding unit to finish the decoding process for a current frame if a decoding time required for the current frame under the first condition is equal to or longer than a prescribed time period; and (c) designate a second condition different from the first condition as to the attributes for the current frame to cause the decoding unit to perform the decoding process on those codes streams that satisfy the second condition if the decoding time required for the current frame under the first condition is shorter than the prescribed time period.

In one embodiment, the decoding unit makes use of the data acquired under the first condition when performing the decoding process under the second condition.

In a second embodiment of the invention, an image processing apparatus includes a coding unit configured to perform a coding process on image data of a moving picture on a frame-by-frame basis to produce coded data consisting of code streams having a plurality of attributes, including at least one of a resolution level, a location, a component, and image quality; and a controller for controlling the coding unit. In one embodiment, the controller is operable to (a) designate a first condition as to the plural attributes for each frame and cause the coding unit to perform the coding process in order to produce code streams that satisfy the first condition; (b) allow the coding unit to finish the coding process for a current frame if a coding time required for the current frame under the first condition is equal to or longer than a prescribed time period; and (c) designate a second condition different from the first condition as to the attributes for the current frame to cause the coding unit to perform the coding process on those codes streams that satisfy the second condition if the coding time required for the current frame under the first condition is shorter than the prescribed time period.

In one embodiment, when performing the coding process under the second condition, the coding unit makes use of the data produced through the coding process under the first condition.

In a third embodiment of the invention, an image processing method for performing a decoding process on coded data of a moving picture on a frame-by-frame basis is provided. The coded data consist of code streams having a plurality of attributes, including at least one of a resolution level, a location, a component, and image quality. The method includes: (a) designating a first condition as to the plural attributes for each frame to perform the decoding process on those code streams having the attributes satisfying the first condition; (b) finishing the decoding process for a current frame if there is no pause request or low-frame-rate playback request received; and (c) designating a second condition different from the first condition as to the attributes to perform the decoding process on those code streams that satisfy the second condition if a pause request or a low-frame-rate playback request has been received.

As an alternative, the method may include the alternative operations (b) and (c) which are as follows: (b) finishing the decoding process for a current frame if the decoding time required to perform the decoding process under the first condition is equal to or longer than a prescribed time period; and (c) designating a second condition different from the first condition as to the attributes to perform the decoding process on those code streams that satisfy the second condition if the decoding time required to perform the decoding process under the first condition is shorter than the prescribed time period.

In one embodiment, when the decoding process is performed under the second condition, data acquired through the decoding process under the first condition are utilized.

In a fourth embodiment of the invention, an image processing method for performing a coding process on image data of a moving picture on a frame-by-frame basis to produce coded data consisting of code streams having a plurality of attributes, including at least one of a resolution level, a location, a component, and image quality, is provided. The method includes: (a) designating a first condition as to the plural attributes for each frame to perform the coding process to produce code streams having the attributes satisfying the first condition; (b) finishing the coding process for a current frame if the coding time required to perform the coding process under the first condition is equal to or longer than a prescribed time period; and (c) designating a second condition different from the first condition for the attributes to perform the coding process to produce code streams satisfying the second condition if the coding time required to perform the coding process under the first condition is shorter than the prescribed time period.

With the decoding technique of the first embodiment, when a pause request or a low-frame-rate playback request is not received (that is, when a moving picture is decoded at a normal frame rate), the first condition is maintained in order to finish the decoding process of the current frame within a 1-frame processing time period without fail. Consequently, the moving picture can be reproduced without dropping frames. On the other hand, if a pause request or a low-frame-rate playback request has been received, the second condition that allows a higher quality decoding process is selected because there is sufficient time for processing a frame, as compared with the normal frame rate. Consequently, a high-quality reproduction of the moving picture can be realized. Because the range of the code streams to be decoded is controlled using multiple attributes, including at least one of resolution level, layer (image quality), component, and precinct (location), the target code streams to be decoded are optimized, taking the processing capability of the decoding unit into account.

With the decoding technique of the second embodiment, if the decoding time of a current frame under the first condition is less that a prescribed period of time, another decoding is performed under the second condition set for higher image quality. Consequently, dropping frames that require longer decoding time can be prevented, and a higher quality reproduction of the moving picture can be realized. Because the range of code streams to be decoded in the frame is controlled using multiple attributes, including at least one of the resolution level, layer (image quality), component, and precinct (location), the target code streams to be decoded can be optimized for each frame, taking the processing capability of the decoding unit into account.

In the first and second embodiments, the data acquired under the first condition are utilized in the second decoding process performed using the second condition, so that the processing workload of the second decoding process can be reduced.

With the coding technique of the third embodiment, if the time required to perform the coding process under the first condition is less than a prescribed time period, another coding process is performed under the second condition to produce higher quality coded data because there is time available for higher quality coding. The shorter the time required for the coding process, the shorter the time required to decode the code streams produced through the coding process is. Accordingly, coded data that can be decoded without dropping frames are produced for those frames that do not have sufficient coding time. On the other hand, coded data that allow higher quality decoding are produced for those frames that have sufficient coding time. Because the coding condition can be controlled using multiple attributes including at least one of resolution level, layer (image quality), component, and precinct (location), the coding condition can be optimized for each frame, taking the processing cability of the coding unit or the decoding unit into account.

Again, by making use of the data produced through the coding process under the first condition when performing the second coding process under the new condition, the coding workload of the second coding operation can be reduced.

Embodiments of the present invention are described below in conjunction with the attached drawings. First, explanation is made of the outline of JPEG 2000.

<Outline of JPEG 2000>

Because in the first embodiment coded data of a moving picture are decoded on the frame-by-frame basis using JPEG 2000, and because in the second embodiment each of the frames of the moving picture is encoded independently of each other using JPEG 2000, the outline of JPEG 2000 is first explained below.

In coding (compression), each of the color components of an original image is divided into non-overlapped rectangular blocks if necessary. Each of the divided blocks is called a "tile". For a moving picture, the number of tiles is one, which means that no tiling is performed. Color space conversion is performed on each of the color components to convert the tiled data (such as RGB data) into YCrCb-space (or YUV-space) data. Then, a two-dimensional wavelet transform (forward transform) is applied to the color-space converted data of each color component to spatially divide the data into frequency bands (subbands).

FIG. 1 illustrates subbands at each of the decomposition levels where the wavelet decomposition level is up to level 3. By applying two-dimensional wavelet transform to the image tile (0LL) of decomposition level 0, subbands 1LL, 1HL, 1LH, and 1HH of decomposition level 1 are acquired. By applying the two-dimensional wavelet transform to the coefficients of the 1LL subband representing the lowest frequency component at decomposition level 1, level-2 subbands 2LL, 2HL, 2LH, and 2HH are acquired. By further applying the two-dimensional wavelet transform to the coefficients of the 2LL subband, which is the lowest component at decomposition level 2, level-3 subbands 3LL, 3HL, 3LH and 3HH are acquired. The parenthesized numbers in the square areas of decomposition level 3 denote the resolution levels.

The wavelet coefficients of each subband are subjected to linear quantization, and then to entropy coding. In JPEG 2000, the wavelet coefficients of each subband are broken down into bit-planes. In addition, each of the subbands is divided into non-overlapped rectangular regions named precincts, and each of the precincts is divided into non-overlapped rectangular regions named code blocks. The wavelet coefficients of each subband are coded from more significant bit-planes to less significant bit-planes for each of the code blocks. To be more precise, each of the bit-planes is divided into three sub-bit-planes (coding channels) for the coefficient coding. In the entropy coding, a target bit to be coded is determined according to the designated coding order, context is produced from the neighborhood bits of the target bit, and context-based arithmetic coding is performed based on probability estimation of the context and the target bit.

Figure 5:
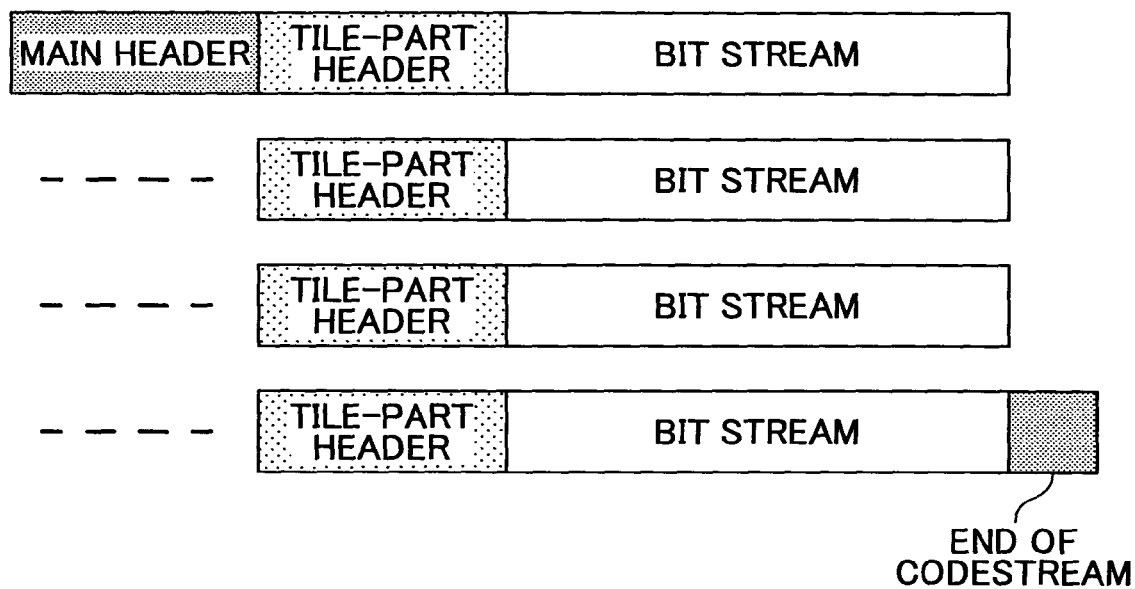
FIG. 5 is a schematic diagram illustrating a structure of a JPEG 200 code stream.

Finally, packets are created such that each packet contains an entropy-coded bit stream. These packets are sequenced according to the progression order, while adding and inserting necessary tags and tag information, to create a code stream having a format illustrated in FIG. 5. A main header is added at the beginning of the code stream, and a tile-part header is inserted at the head of each tile such that the bit stream of the tile follows the tile-part header. An end tag ("End of codestream") is placed at the end of the code stream.

Among an image, a tile, a precinct and a code block, there is a magnitude relationship of image≧tile>subband≧precinct≧code-block.

A precinct is a set of three rectangular regions located at the same relative positions in the HL, LH and HH subbands at a same decomposition level. It should be noted that in the LL subband a single rectangular region is treated as a precinct. The size of a precinct may be the same as the subband size. A rectangular region defined by dividing a precinct is a code block. FIG. 2 illustrates an example of precincts and code blocks at decomposition level 2. Three rectangular regions located at the same relative positions in the three subbands are treated as a precinct. The precinct corresponds to particular rectangular areas on the image tile. In the example shown in FIG. 2, an image tile is divided into 3×3 rectangular regions, and each set of the nine (3×3) corresponding rectangular regions is a precinct.

A part of code bits (for example, code bits of three bit planes from the most significant bit to the third significant bit) are extracted from each of all the code blocks contained in a precinct to form a packet. An empty packet may be acceptable. The code bits extracted from the block codes are assembled into corresponding packets, and packets are sequenced according to a desired progression order to produce a code stream shown in FIG. 5.

By assembling the packets of all the precincts (that is, all the code blocks and all the subbands), a part of code bits of the entire image, for example, coded bits from the most significant bit-plane to the third significant bit-plane of the wavelet coefficients of the entire image region is obtained. This code bit set constitutes a layer. Of course, the packets of all the precincts do not always have to be included in a layer. As the number of coded layers increases, the reproduced image quality is improved. By gathering all the layers, code bits of all the bit-planes of the entire image region can be acquired.

In decoding (decompression) JPEG 2000 code streams, the tag information added to the externally input code stream is interpreted, the code stream is divided into multiple bit streams corresponding to the tiles for each color component, and decoding is performed for each of the bit streams (i.e., for each tile) of each color component. The bit position to be decoded is determined according to the order described in the tag information of the code stream, and context is generated from the line of the already-decoded neighborhood bits of the target bit. The target bit is generated through the decoding process based on a probability estimation using the context and the code stream, and the generated bit is written in the position of the target bit.

The acquired coefficients of each sub-band are dequantized if the data are subjected to quantization during the coding process, and then two-dimensional inverse wavelet transform is performed to restore the image data of each tile for each component. The restored data are subjected to inverse color space conversion if color space conversion is performed during the coding process to bring the data back to that of the original color space.

A packet, which is a unit set of the bit stream of JPEG 2000, has four attributes C, R, P and L, that is, (i) to which component (C) the packet belongs;
(ii) to which resolution level (R) the packet belongs;
(iii) to which precinct (P pertinent to location) the packet belongs; and
(iv) to which layer (L pertinent to image quality) the packet belongs. The sequence of packets depends upon the order of attributes in which the packets are to be arranged. The sequencing order is named a progression order. In JPEG 2000, five progression orders, LRCP, RLCP, RPCL, PCRL, and CPRL are defined.

Next, explanation is made of how packets are sequenced in the progression order during the coding process and how attributes of the packets are interpreted in the progression order during the decoding process.

With LRCP progression, packets are sequenced and interpreted in the coding and decoding processes according to the nested "for" loop illustrated below.

```
For(Layer){
    for(Resolution){
        for(Component){
            for(Precinct){
                In coding: sequence packet
                In decoding: interpret attribute of packet
            }
        }
    }
}.
```

Similarly, with RLCP progression, packets are sequenced and interpreted in the coding and decoding processes according to the nested "for" loop illustrated below.

```
For(Resolution){
    for(Layer){
        for(Component){
            for(Precinct){
                In coding: sequence packet
                In decoding: interpret attribute of packet
            }
        }
    }
}.
```

Each packet has a packet header, in which header information items about
  whether the packet is empty packet;
  which code blocks are contained in the packet
  the number of zero-bit planes of each code block contained in the packet
  the number of coding paths (the number of bit-planes) of each code block contained in the packet;
and
  the code length of each code block contained in the packet
are described.

The packet header does not include any layer number or resolution level. The layer and the resolution level of the packet can be determined by forming the "for" loop according to the progression order described in the COD marker in the main header, by finding the packet boundary from the sum of the code lengths of the code blocks contained in the packet, and by determining at which position in the "for" loop the packet is handled. This means that the next packet can be detected without decoding the entropy code itself once the code length is extracted from the packet header.

Figure 3:
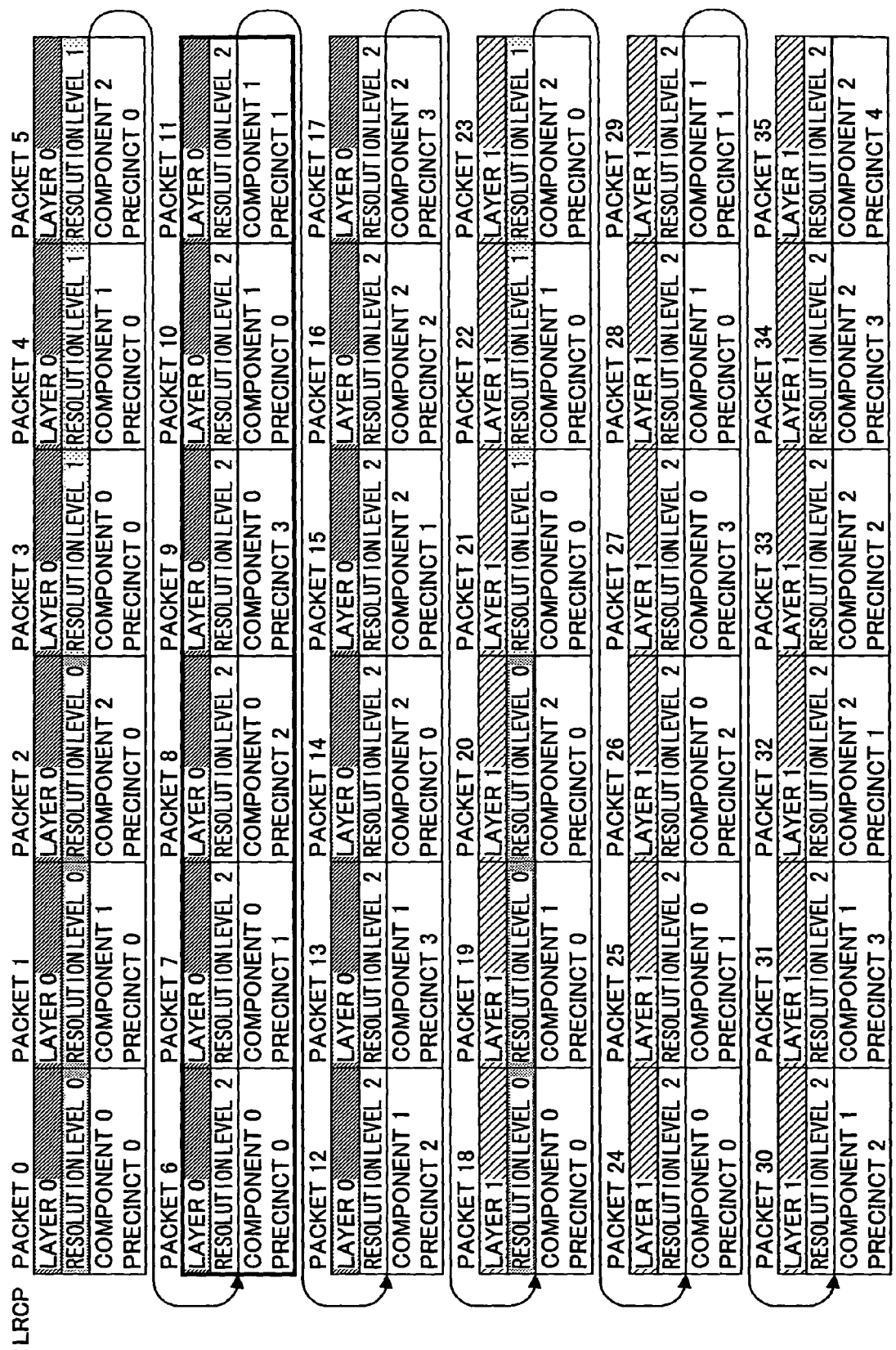
FIG. 3 is a schematic diagram illustrating a packet sequence in LRCP progression order for a JPEG 2000 code stream.
Figure 4:
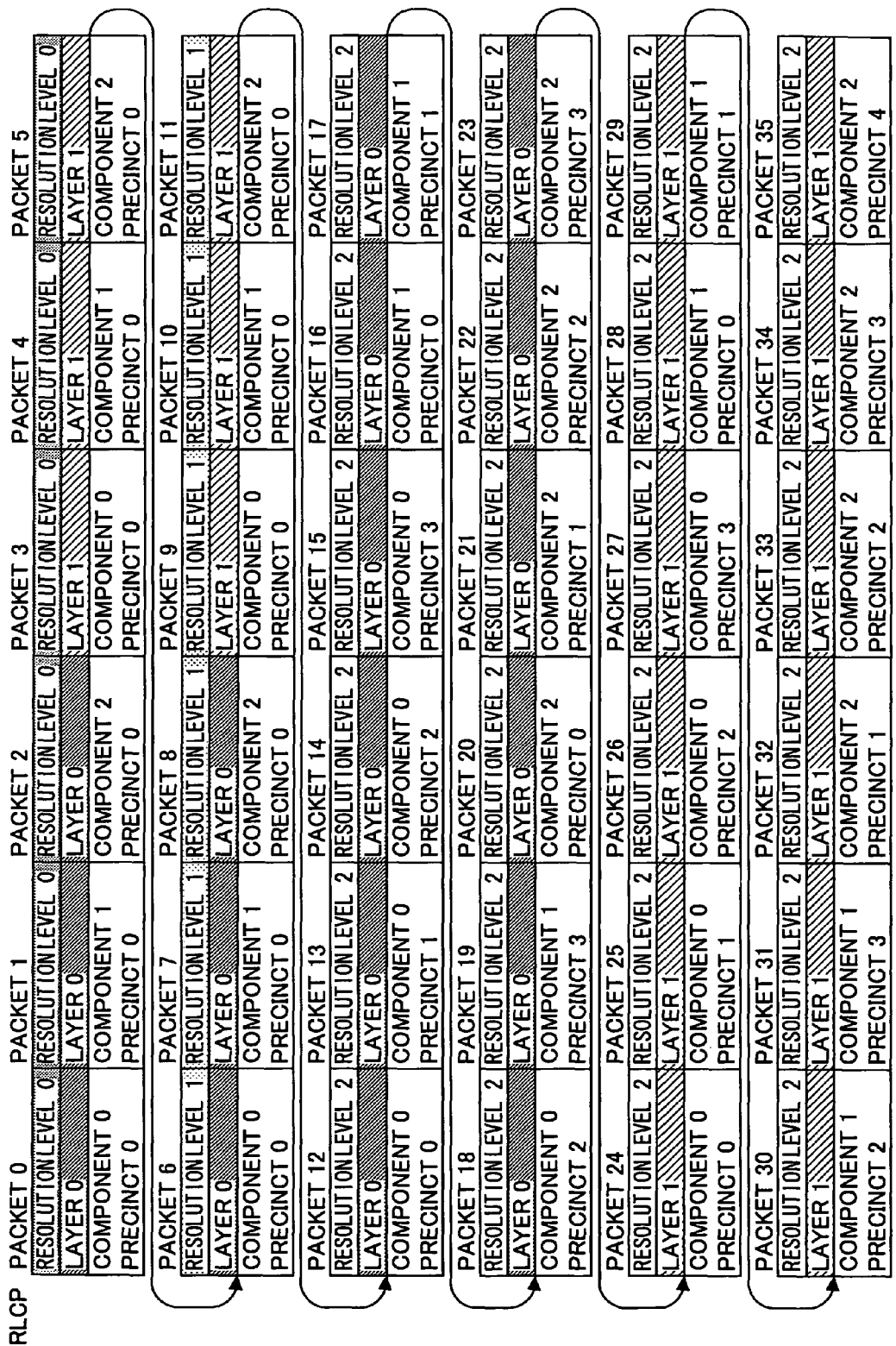
FIG. 4 is a schematic diagram illustrating a packet sequence in RLCP progression order for a JPEG 2000 code stream.

FIGS. 3 and 4 illustrate examples of packet sequence of the LRCP progression order and RLCP progression order, respectively, with the conditions image size 100×100 pixels, 1 tile, 2 layers, resolution levels of 0, 1 and 2, three color components, and precinct size 32×32.

Embodiment 1

Figure 6:
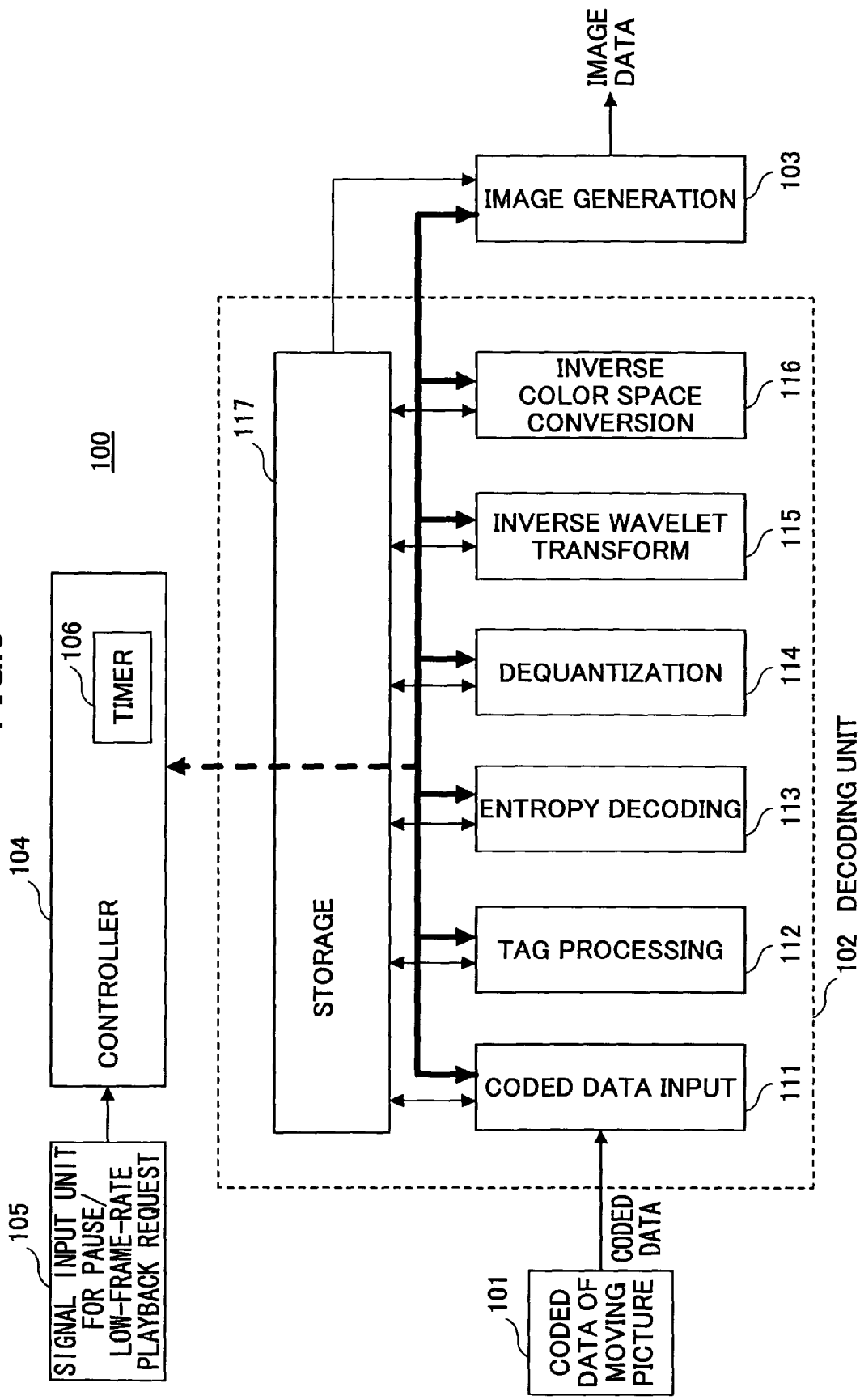
FIG. 6 is a schematic block diagram of an image processing apparatus according to the first embodiment of the invention.

FIG. 6 is a block diagram of an image processing apparatus according to the first embodiment of the invention. The image processing apparatus 100 takes in code streams of a moving picture from a storage 101, such as a hard disk drive, to perform a decoding process on the moving picture on the frame-by-frame basis in order to generate frame-based image data, and outputs the generated image data to a display device (not shown). The coded data of the moving picture are JPEG 2000 code streams independently coded on the frame-by-frame basis.

The image processing apparatus 100 includes three major functional parts, namely, a decoding unit 102 that performs a decoding process on the coded data of the moving picture, an image generating unit 103 that generates frame-based image data from the decoded data output from the decoding unit 102, and a controller 104 that controls the operations of the decoding unit 102 and the image generating unit 103. The image data generated by the image generating unit 103 are output to a display device (not shown). The image processing apparatus 100 also has a signal input unit 105 for inputting a pause request and/or a low-frame-rate playback request to the controller 104. Such requests are generated by user's manipulation through a manipulation device (not shown). The controller 104 has a timer 106 for timing a remaining time or a time difference between a prescribed decoding time assigned to each frame and time lapse from the beginning of the frame-based decoding process performed by the decoding unit 102. It is assumed in this embodiment that the minimum value of the timer 106 is zero and no negative value is taken.

The decoding unit 102 includes a coded data input unit 111 for reading each frame of the code stream of the moving picture. The decoding unit 102 also includes a tag processing unit 112, an entropy decoding unit 113, a dequantizing unit 114, an inverse wavelet transform unit 115, and an inverse color space conversion unit 116 to perform the decoding process on the frame-based code stream according to the JPEG 2000 algorithm. The decoding unit 102 further includes a storage unit 117 for temporarily storing the supplied coded data and/or intermediate data or final data of the decoding process. The storage unit 117 is accessible from the image generating unit 103 and the controller 104.

Figure 7:
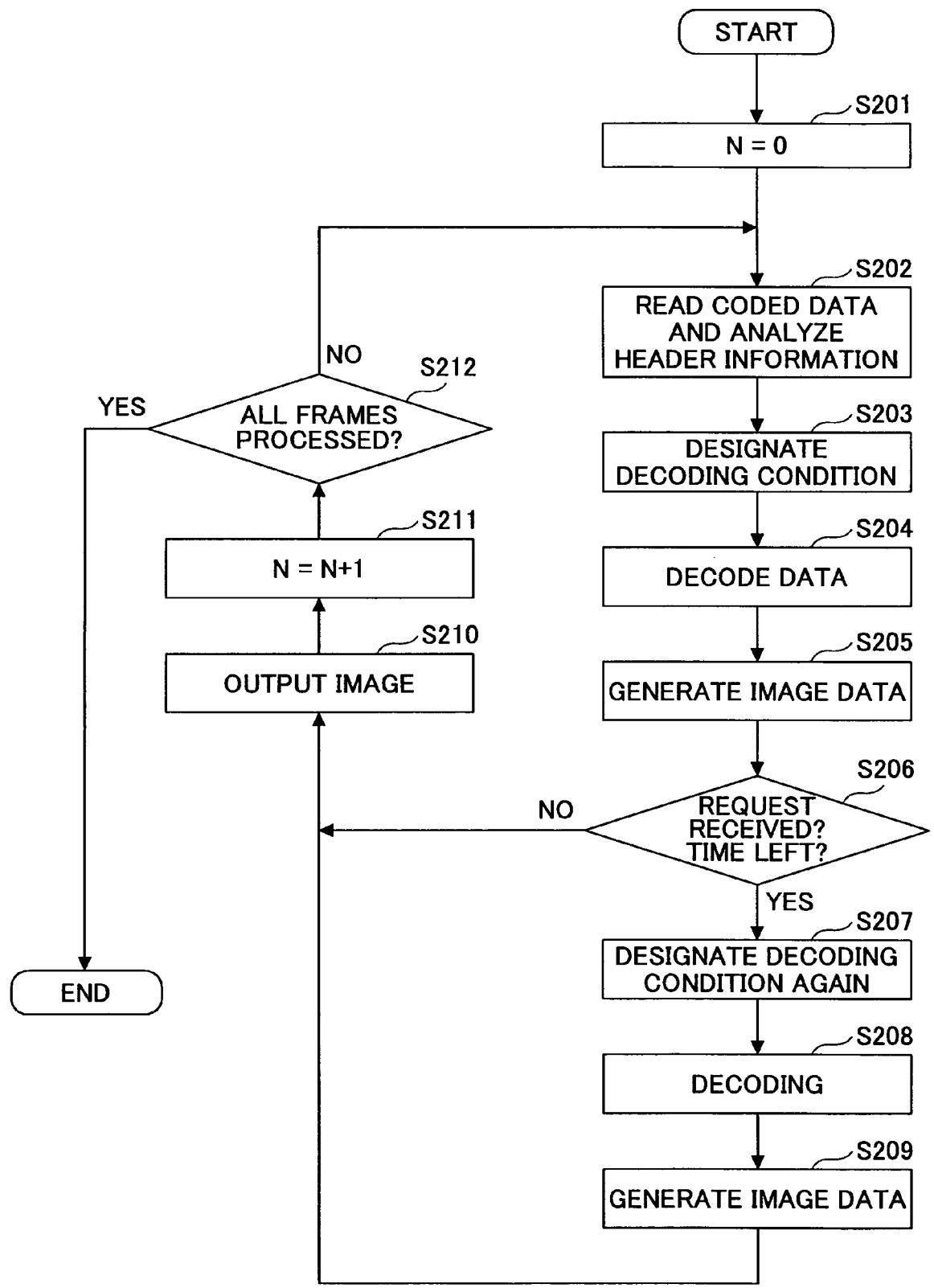
FIG. 7 is a flowchart showing the operations of the image processing apparatus according to the first embodiment of the invention.

FIG. 7 is a flowchart showing the operations of the image processing apparatus 100. It is assumed in this example that the coded data are not tiled (that is, the number of tiles is one).

In step 201, the controller 104 sets the internal frame number counter value N to zero (N=0) and initializes the decoding unit 102.

In step 202, the controller 104 instructs the decoding unit 102 to start decoding the coded data of a certain frame designated by the frame number counter value N (the initial frame number is zero). In the decoding unit 102, the coded data input unit 111 reads at least the main header and the tile part headers of the code stream of the current frame, and the tag processing unit 112 analyzes the header information. Through the header analysis, the original image size of the coded image data, the number of tiles, the number of color components, the number of resolution levels, the number of layers, the number of precincts, the packet progression order, and other necessary information are acquired. If a set of packet headers is recorded in the main header or the tile part header, the length and location of each packet can be known without checking the packet. Based on the analysis result, each packet (bit stream) of the coded data can be classified according to the attributes, such as the resolution level, the layer, the color component, and the precinct. The analysis result of the header information and the coded data read by the input unit 111 are temporarily stored in the storage unit 117.

In step 203, the controller 104 determines a decoding condition as to the attributes (the resolution level, the layer or the image quality, the color component, and the precinct or the location in this example) based on the analysis result of the packet information stored in the storage unit 117 in order to determine the range of the target packet (bit stream) to be decoded. The decoding condition is supplied to the decoding unit 102. An example of the decoding condition is "Resolution levels 0 and 1; Component 0; All Precincts; Layer 0".

In step 204, the decoding unit 102 performs a decoding process for the bit streams that satisfy the decoding condition. In this example, the coded data satisfying resolution level 0 and 1, component 0, all the precincts, and layer 0 are the target of the current decoding step. If all the bit streams (packets) of the current frame have been read in step 202, then the decoding process can be started immediately. If at least a portion of the packets have not been read yet, the coded data input unit 111 reads additional necessary bit streams and the tag processing unit 112 analyzes and classifies the additional bit streams to allow the decoding process to be executed in step 204. The decoding process includes entropy decoding, dequantization, two-dimensional inverse wavelet transform, and inverse color space conversion. The entropy decoding is performed by the entropy decoding unit 113. Dequantization is performed by the dequantizing unit 114 on the quantized coefficients (corresponding to the wavelet coefficients quantized during the coding process) generated through the entropy decoding. Two-dimensional inverse wavelet transform is performed by the inverse wavelet transform unit 115 on the dequantized wavelet coefficients. Inverse color space conversion is performed by the inverse color space conversion unit 116 on each of the color component data items generated through the two-dimensional inverse wavelet transform. It should be noted that dequantizing unit 114 does not perform dequantization on unquantized coded data. The intermediate data and the final data of the decoding process are temporarily stored in the storage unit 117.

In step 205, the image generating unit 103 generates image data from the current frame decoded data stored in the storage unit 117 and outputs the generated image data to the display device.

In step 206, the controller 104 determines whether a pause request or a low-frame-rate playback request has been received from the signal input unit 105. If there is not a pause request or low-frame-rate playback request input from the signal input unit 105, then the controller 104 determines whether the timer value of the timer 106 is zero. If no pause request or low-frame-rate playback request has been input, and if the timer value of the timer 106 is zero, which means that there is no time left (NO in step 206), the process jumps to step 210 under the control of the controller 104. If there is a pause request or a low-frame-rate playback request has been input, or if the timer value of time 106 is greater than zero without any pause request or low-frame-rate playback request, which means that time is still left (YES in step 206), then the controller 104 allows the process to proceed to step 207.

When the process jumps from step 206 to step 210, the controller 104 allows the image generating unit 103 to output the image data of the current frame (step 210), and increments the frame number counter (step 211). If the frame number counter value N exceeds the last frame number of the currently processed moving picture (YES in step 212), the series of operations are terminated. If the frame number counter value N does not exceed the last frame number (NO in step 212), the process returns to step 202 to start the decoding process for the next frame.

When the process proceeds from step 206 to step 207, the controller 104 refers to the header information analysis result stored in the storage unit 117 to determine a new decoding condition in order to achieve a higher decoding quality by extending or changing the range of the target code stream to be decoded determined in step 203, and designates the new decoding condition in the decoding unit 102. For example, the new decoding condition is designated in order to include bit streams of a higher resolution level, a lower layer, or a precinct and/or a component in the target code to be decoded.

In step 208, the decoding unit 102 performs a decoding process again on the code streams having attributes that satisfy the newly designated decoding condition. If the target code streams have already been read out, the decoding process is immediately performed. If at least a portion of the target code streams have not been read out, the necessary portions of the target code streams are read out by the coded data input unit 111 prior to starting the decoding process. There are two methods for performing the decoding process of step 208. One is to decode all parts of the target code streams again, and the other is to perform the decoding process only on the code subtraction which is the difference between the new target codes streams and the already decoded portions processed in step 204. In the latter case, only the subtracted portion of the target code stream is subjected to the decoding process up to entropy decoding or dequantization, and a set of wavelet coefficients obtained through this decoding process is combined with another set of wavelet coefficients obtained in the entropy decoding or the dequantization in step 204 and stored in the storage unit 117. The combined wavelet data are subjected to dequantization or two-dimensional inverse wavelet transform and the subsequent process. The latter method making use of the data acquired in step 204 is advantageous because the processing workload and time can be reduced, as compared with the former method. It should be noted that even with the latter method, it may be necessary for the already decoded upper layer code stream to be subjected to entropy decoding again in order to decode a newly added lower layer code stream, depending on the progress of the termination process of the entropy code stream.

After the decoding process, the image generating unit 103 generates image data of the current frame based on the decoded data stored in the storage unit 111 for output to the display device (step 209). The controller 104 causes the image generating unit 103 to output the current frame image data (step 210), and increments the frame number counter (step 211). If the frame number counter value N exceeds the last frame number of the currently being processed moving picture (YES in step 212), the process terminates. If the frame number counter value N does not exceeds the last frame number (NO in step 212), the process returns to step 202 to process the next frame.

With the image processing apparatus 10 of this embodiment, those frames that require longer processing time can be appropriately decoded without dropping frames, and higher quality decoding can be performed by extending the range of the code stream to be decoded when there is sufficient processing time or when a pause request or a low-frame-rate playback request is received. Because the range of the target code stream to be decoded is determined using multiple attributes, including the resolution level, the layer (image quality), the color component, and the precinct (location) in this example, the range of the target code stream can be optimized in steps 203 and 207, taking the processing capability of the decoding unit 102 into account, as compared with the conventional technique for selecting the target code stream to be decoded based only on the resolution level.

Figure 10:
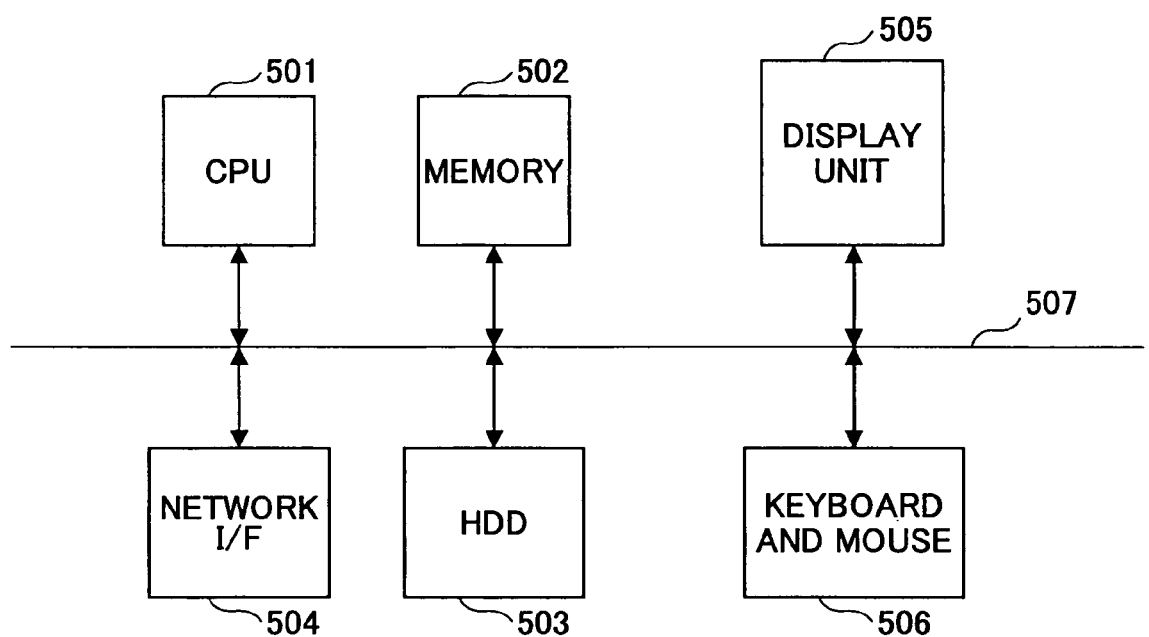
FIG. 10 is a schematic diagram of a computer to which the image processing apparatus of the embodiment may be applied.

The image processing apparatus 100 may make use of a computer illustrated in FIG. 10 with CPU 501, memory 502, hard disk device 503, network interface 504, display device 505, and input device 506 including a keyboard and a mouse, which components are mutually connected by a bus 507, in combination with a program for realizing the above-described operations. In this case, a program for causing the computer to function as the decoding unit 102, the image generating unit 103, the controller 104, and the input unit 105 is loaded in the memory 502, and is executed by the CPU 501 to allow the computer to serve as the image processing unit 100. Coded data of a moving picture may be taken in from a server on a network via the network interface 504 and stored in the memory 502 or the hard disk device 503. The above-described decoding operations are performed on the decoded data of the moving picture on the frame-by-frame basis, and the generated image data are displayed on the display device 505 as a moving picture.

The above-described program and a computer-readable information recording medium (such as a magnetic disk, an optical disk, a magneto optical disk, or a semiconductor storage device) storing the program are also included in the scope of the invention.

Embodiment 2

Figure 8:
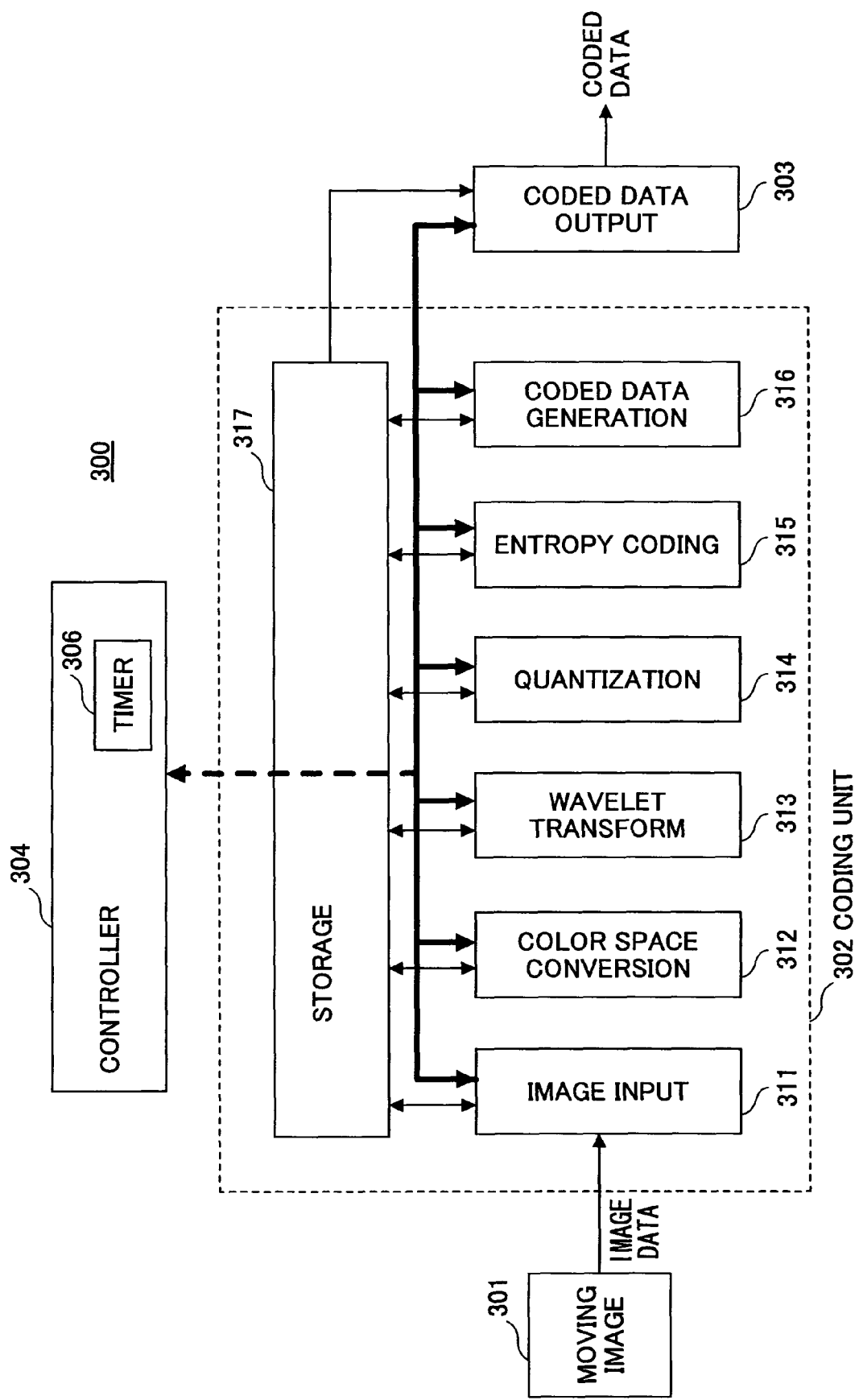
FIG. 8 is a schematic block diagram of an image processing apparatus according to the second embodiment of the invention.

FIG. 8 is a block diagram of an image processing apparatus 300 according to the second embodiment of the invention. The image processing apparatus reads frame-based image data of a moving picture out of the storage device 301 (e.g., a hard disk drive), encodes the image data, and outputs the coded data. The coded data of the moving picture are data streams independently encoded on the frame-by-frame basis according to the JPEG 2000 algorithm.

The image processing apparatus 300 includes three major functional parts, namely, a coding unit 302 that performs a coding process, a coded data output unit 303 that externally outputs the coded data produced by the coding unit 302, and a controller 304 that controls the operations of the coding unit 302 and the coded data output unit 303. The controller 304 has a timer 306 for measuring remaining time or a time difference between a prescribed coding time assigned to each frame and time lapse from the beginning of the frame-based coding process performed by the coding unit 302. It is assumed in this embodiment that the minimum value of the timer 306 is zero and no negative value is taken.

The coding unit 302 includes an image input unit 311 for reading each frame of image data of the moving picture. The coding unit 302 also includes a color space conversion unit 312, a wavelet transform unit 313, a quantization unit 314, an entropy coding unit 315, and a coded data generating unit 316 to perform a coding process on the image data according to the JPEG 2000 algorithm. The coding unit 302 further includes a storage unit 317 for temporarily storing the supplied image data and/or intermediate data or final data of the coding process. The storage unit 317 is accessible from the coded data output unit 303 and the controller 304.

Figure 9:
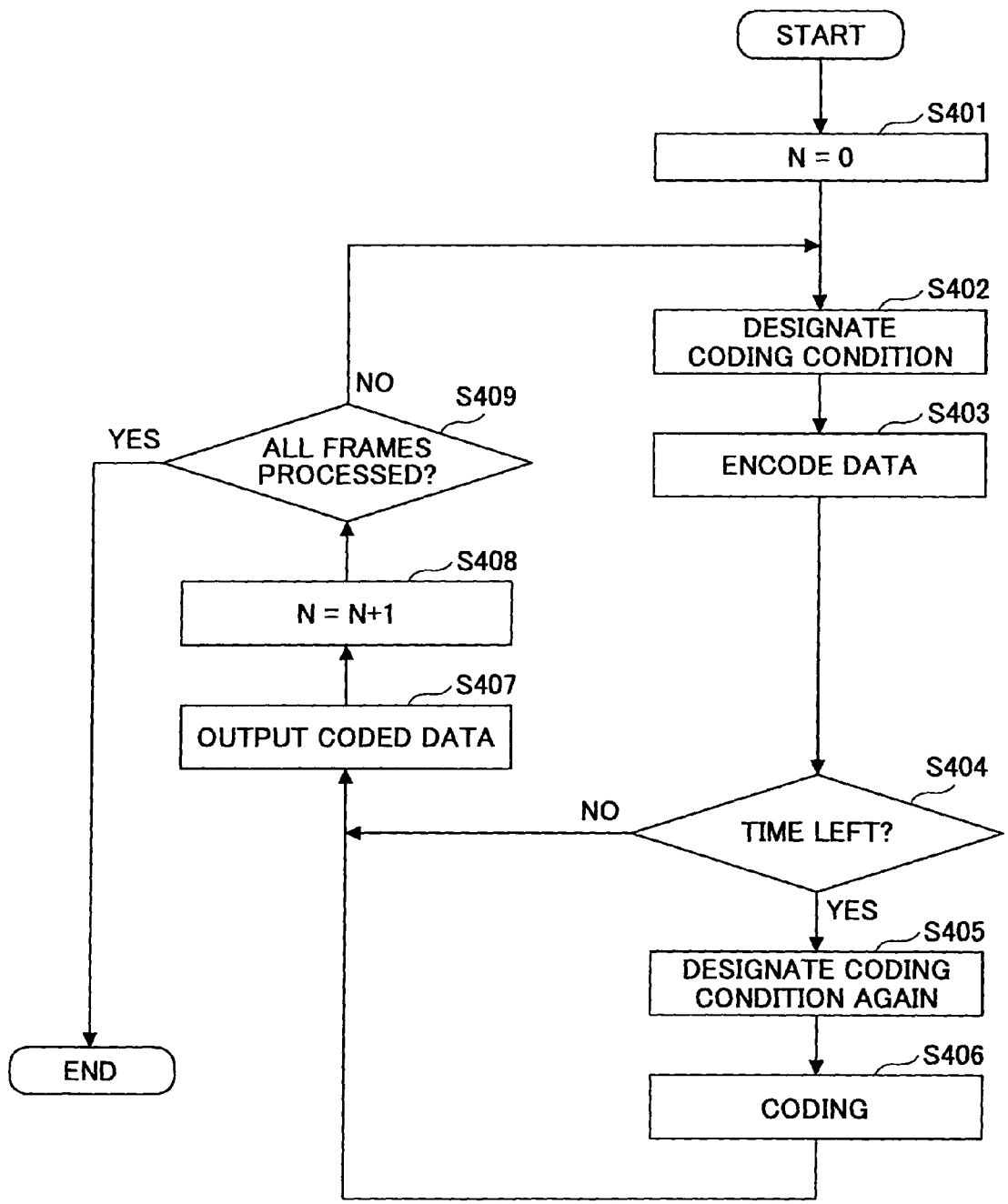
FIG. 9 is a flowchart showing the operations of the image processing apparatus according to the second embodiment of the invention.

FIG. 9 is a flowchart showing the operations of the image processing apparatus 300. It is assumed in this example that image data are not tiled (that is, the number of tiles is one) in the coding process.

In step 401, the controller 304 sets the internal frame number counter value N to zero (N=0) and initializes the coding unit 302.

In step 402, the controller 304 determines a coding condition as to the attributes, such as the resolution level, the layer (the image quality), the color component, or the precinct (the location), designates the determine condition in the coding unit 302, and causes the coding unit 302 to start the coding process on the frame (current frame) corresponding to the frame number counter value N. An example of the coding condition is "Resolution level 0 and 1 among three levels, All precincts among four precincts, Components 0, 1 and 2 among three color components; Layer 0 among 2 layers". This condition is referred to as coding condition 1.

In step 403, the image data input unit 311 of the coding unit 302 reads the image data of the frame number N from the storage unit 301 to perform in the coding unit 302 a coding process for generating coded data consisting of bit streams (packets) having attributes satisfying the coding condition designated by the controller 304. The coding process includes color space conversion performed by the color space conversion unit 312 to convert the frame-based image data (RGB data, for example) to YCbCr data; a two-dimensional wavelet transform performed by the wavelet transform unit 313 on each of the components of the color-space-converted data; quantization (if necessary) performed by the quantizing unit 314 on the generated wavelet coefficients, entropy coding performed by entropy coding unit 315 on the quantized (or unquantized when no quantization is performed) wavelet coefficients; and generation of coded data (code streams) performed by the coded data generating unit 316. In generating the code streams, packets are generated by assembling necessary sets of entropy bits, arranged in a prescribed order with necessary header information added.

Under the above-described coding condition 1, a two-dimensional wavelet transform of decomposition level 2 (among three decomposition levels) is performed to produce wavelet coefficients of resolution levels 0 and 1. Then, entropy coding is performed in the layer-0 bit plane divided into four precincts. As a result, coded data consisting of packets of "resolution levels 0 and 1, all precincts, three components, and layer 0" are produced. The intermediate and final data produced in the coding process, as well as the status of the coding unit 302, are temporarily stored in the storage unit 317.

In step 404, the controller 304 determines whether the timer value of the timer 306 is zero. If the timer value of the timer 306 is zero (which means that no time is left), the process jumps to step 407. If the time value is greater than zero (which means that the processing time required for the coding operation is shorter than the prescribed coding time), the process proceeds to step 405.

When the process jumps from step 404 to step 407, the controller 304 allows the coded data output unit 303 to output the coded data of the current frame temporarily stored in the storage unit 317 (step 407), and increments the frame number counter (step 408). If the frame number counter value N exceeds the last frame number of the currently processed moving picture (YES in step 409), the series of operations are terminated. If the frame number counter value N does not exceed the last frame number (NO in step 409), the process returns to step 402 to start the coding process for the next frame.

When the process proceeds from step 404 to step 405, the coding condition is changed to the optimum condition because there is a room for improving the coding condition in order to provide a higher image quality. In general, the shorter the coding processing time is, the shorter is the required decoding time is. If there is a certain time left in the coding process, coded streams allowing a higher quality decoding can be produced.

Then, in step 405, the controller 304 designates a new coding condition for producing higher-quality coded data, as compared with the coded data produced in step 403, in the coding unit 302, and causes the coding unit 302 to perform the coding process again under the new coding condition. In step 406, the coding unit 302 performs a coding process under the newly designated coding condition.

A new coding condition 2 determined in step 405 is, for example, "Resolution levels 0, 1 and 2 among three resolution levels; all precincts among 4 precincts; components 0, 1 and 2 among three color components; and layer 0 and 1 among two layers". In this case, the coding process of step 406 may be performed on all of the image data of the current frame under the new coding condition 2, or alternatively, on only the necessary (additional) portion of the image data by making use of the coded data acquired and stored in step 403. Because in the latter case the wavelet coefficients of resolution level 2 have already been acquired, full-bit-plane entropy coding is performed for the wavelet coefficients of decomposition level 2. In addition, entropy coding of layer-1 bit-plane is performed on the wavelet coefficients of resolution levels 0 and 1. Using the newly generated entropy bits, additional packets are produced to generate code streams having attributes of "Resolution level 0, 1 and 2; All precincts; Components 0, 1 and 2; Layer 0 and 1".

After the coding step, the controller 304 causes the code data output unit 303 to output the coded data stored in the storage unit 317 (step 407), and increments the frame number counter (step S408). If the frame number counter value N exceeds the last frame number of the currently processed moving picture (YES in step 409), the series of operations terminates. If the frame number counter value N does not exceed the last frame number (NO in step 409), the process returns to step 402 to start the process for the next frame.

In this manner, the image processing apparatus 300 changes the coding condition if the coding time required for the current frame is less than the prescribed time period and performs the coding again under the new condition, so that high-quality coded data can be generated. In general, the shorter the coding time, the shorter is the decoding time for the coded data. Accordingly, for those frames not given sufficient coding time, coded data are generated in order to prevent dropping frames when decoded. In contrast, for those frames with sufficient coding time given, such coded data that allow high-quality decoding are generated. Because the coding condition is designated using attributes, including at least one of the resolution level, the layer (image quality), the component, and the precinct (location), the coding conditions can be optimized in steps 403 and 405 more easily, taking the processing ability of the coding unit 302 into account, as compared with controlling the coding condition based only upon the resolution level.

The image processing apparatus 300 may make use of a computer illustrated in FIG. 10 with CPU 501, memory 502, hard disk device 503, network interface 504, display device 505, and input device 506 including a keyboard and a mouse, which components are mutually connected by a bus 507, in combination with a program for realizing the above-described operations. In this case, a program for causing the computer to function as the coding unit 302, the coded data output unit 303, and the controller 304 is loaded in the memory 502 and is executed by the CPU 501 to allow the computer to serve as the image processing unit 300. The image data of the moving picture are read by the hard disk drive 503 on the frame-by-frame basis, and the above-described coding process is performed. The generated coded data are stored in the hard disk drive 503, and output and supplied to other equipment on the network via the network interface 504, as necessary.

The above-described program and a computer-readable information recording medium (such as a magnetic disk, an optical disk, a magneto optical disk, or a semiconductor storage device) storing the program are also included in the scope of the invention.

Although the above-described embodiments relating to the method and the apparatus of image processing has been described using as an example the JPEG 2000 coding scheme, other coding schemes may be used.

This patent application is based upon and claims the benefit of the earlier filing date of Japanese Patent Application No. 2005-330990 filed Nov. 16, 2005, the entire contents of which are incorporated herein by reference.

What is claimed is:

1. An image processing apparatus comprising:
a decoding unit of a computer to perform a decoding process on coded data of a moving picture on a frame-by-frame basis, the coded data consisting of code streams having a plurality of attributes, including a resolution level, a precinct, a component, and a layer; and
a controller of the computer to designate a first condition as to the plurality of attributes for each frame to determine a range of target code streams to be decoded and cause the decoding unit to perform the decoding process on the determined range of the target code streams that satisfy the first condition;
the controller to allow the decoding unit to finish the decoding process for a current frame if there is no pause request or low-frame-rate playback request received, and to designate a second condition as to the plurality of attributes different from one or more of the plurality of attributes for the first condition for the current frame to cause the decoding unit to perform the decoding process on those target codes streams that satisfy the second condition if the pause request or the low-frame-rate playback request has been received.

2. An image processing apparatus comprising:
a decoding unit of a computer to perform a decoding process on coded data of a moving picture on a frame-by-frame basis, the coded data consisting of code streams having a plurality of attributes, including a resolution level, a precinct, a component, and a layer; and
a controller of the computer to designate a first condition as to the plurality of attributes for each frame to determine a range of target code streams to be decoded and cause the decoding unit to perform the decoding process on the determined range of the target code streams that satisfy the first condition;
the controller to allow the decoding unit to finish the decoding process for a current frame if a decoding time required for the current frame under the first condition is equal to or longer than a prescribed time period, and to designate a second condition as to the plurality of attributes different from one or more of the plurality of attributes for the first condition for the current frame to cause the decoding unit to perform the decoding process on those target codes streams that satisfy the second condition if the decoding time required for the current frame under the first condition is shorter than the prescribed time period.

3. The image processing apparatus of claim 1 or 2, wherein when performing the decoding process under the second condition, the decoding unit makes use of data acquired under the first condition.

4. An image processing apparatus comprising:
 a coding unit of a computer to perform a coding process on image data of a moving picture on a frame-by-frame basis to produce coded data consisting of code streams having a plurality of attributes, including a resolution level, a precinct, a component, and a layer; and
 a controller of the computer to designate a first condition as to the plurality of attributes for each frame to determine a range of target code streams to be decoded and cause the coding unit to perform the coding process in order to produce the determined range of the target code streams that satisfy the first condition;
 the controller to allow the coding unit to finish the coding process for a current frame if a coding time required for the current frame under the first condition is equal to or longer than a prescribed time period, and to designate a second condition as to the plurality of attributes different from one or more of the plurality of attributes for the first condition for the current frame to cause the coding unit to perforin the coding process on those target codes streams that satisfy the second condition if the coding time required for the current frame under the first condition is shorter than the prescribed time period.

5. The image processing apparatus of claim 4, wherein when performing the coding process under the second condition, the coding unit makes use of data produced through the coding process under the first condition.

6. An image processing method for performing a decoding process on coded data of a moving picture on a frame-by-frame basis, the coded data consisting of code streams having a plurality of attributes, including a resolution level, a precinct, a component, and a layer, the method comprising:
 designating, by a processor, a first condition as to the plurality of attributes for each frame to determine a range of target code streams to be decoded and to perform the decoding process on the determined range of the target code streams having the plurality of attributes satisfying the first condition;
 finishing the decoding process for a current frame if there is no pause request or low-frame-rate playback request received; and
 designating a second condition as to the plurality of attributes different from one or more of the plurality of attributes for the first condition to perform the decoding process on those target code streams that satisfy the second condition if a pause request or a low-frame-rate playback request has been received.

7. An image processing method for performing a decoding process on coded data of a moving picture on a frame-by-frame basis, the coded data consisting of code streams having a plurality of attributes, including a resolution level, a precinct, a component, and a layer, the method comprising:
 designating, by a processor, a first condition as to the plurality of attributes for each frame to determine a range of target code streams to be decoded and to perform the decoding process on the determined range of the target code streams having the plurality of attributes that satisfy the first condition;
 finishing the decoding process for a current frame if the decoding time required to perform the decoding process under the first condition is equal to or longer than a prescribed time period; and
 designating a second condition as to the plurality of attributes different from one or more of the plurality of attributes for the first condition to perform the decoding process on those target code streams that satisfy the second condition if the decoding time required to perform the decoding process under the first condition is shorter than the prescribed time period.

8. The image processing method of claim 6 or 7, wherein the decoding process is performed under the second condition making use of the data acquired though the decoding process under the first condition.

9. An image processing method for performing a coding process on image data of a moving picture on a frame-by-frame basis to produce coded data consisting of code streams having a plurality of attributes, including a resolution level, a precinct, a component, and a layer, the method comprising:
 designating, by a processor, a first condition as to the plurality of attributes for each frame to determine a range of target code streams to be decoded and to perform the coding process to produce target code streams having the plurality of attributes satisfying the first condition;
 finishing the coding process for a current frame if the coding time required to perform the coding process under the first condition is equal to or longer than a prescribed time period; and
 designating a second condition as to the plurality of attributes different from one or more of the plurality of attributes for the first condition to perform the coding process to produce target code streams satisfying the second condition if the coding time required to perform the coding process under the first condition is shorter than the prescribed time period.

10. The image processing method of claim 9, wherein the coding process is performed under the second condition making use of data acquired through the coding process under the first condition.

* * * * *